(No Model.)

S. H. JONES.
FERTILIZER DISTRIBUTER.

No. 582,162. Patented May 4, 1897.

Witnesses
C. W. Miles.
Oliver B. Kaiser.

Inventor
Sylvester H. Jones
By Wood & Boyd
Attorneys

THE NORRIS PETERS CO., PHOTO-LITHO., WASHINGTON, D. C.

UNITED STATES PATENT OFFICE.

SYLVESTER H. JONES, OF RICHMOND, INDIANA, ASSIGNOR TO THE HOOSIER DRILL COMPANY, OF SAME PLACE.

FERTILIZER-DISTRIBUTER.

SPECIFICATION forming part of Letters Patent No. 582,162, dated May 4, 1897.

Application filed November 14, 1896. Serial No. 612,133. (No model.)

*To all whom it may concern:*

Be it known that I, SYLVESTER H. JONES, residing at Richmond, in the county of Wayne and State of Indiana, have invented certain new and useful Improvements in Fertilizer-Distributers, of which the following is a specification.

My invention relates to that class of fertilizer-distributers which employ horizontal rotary disks for carrying forward and discharging the material.

The objects of my invention are, first, to provide suitable means within the hopper for delivering the fertilizer by keeping the disks covered with the fertilizing material, preventing its arching or bridging within the hopper, and to prevent clogging of the orifices of discharge; second, to provide improved gate-adjusting mechanism by which the amount of discharge is regulated. These objects are attained by means of the devices illustrated in the accompanying drawings, making a part of this specification, in which—

Figure 1:
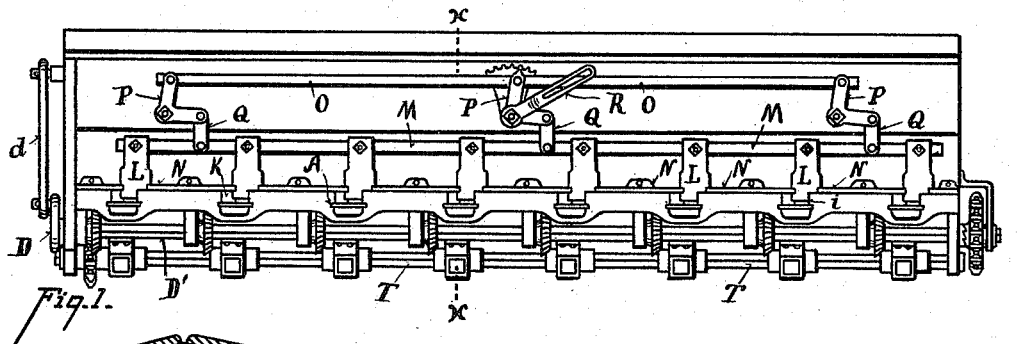
Figures 2, 3:
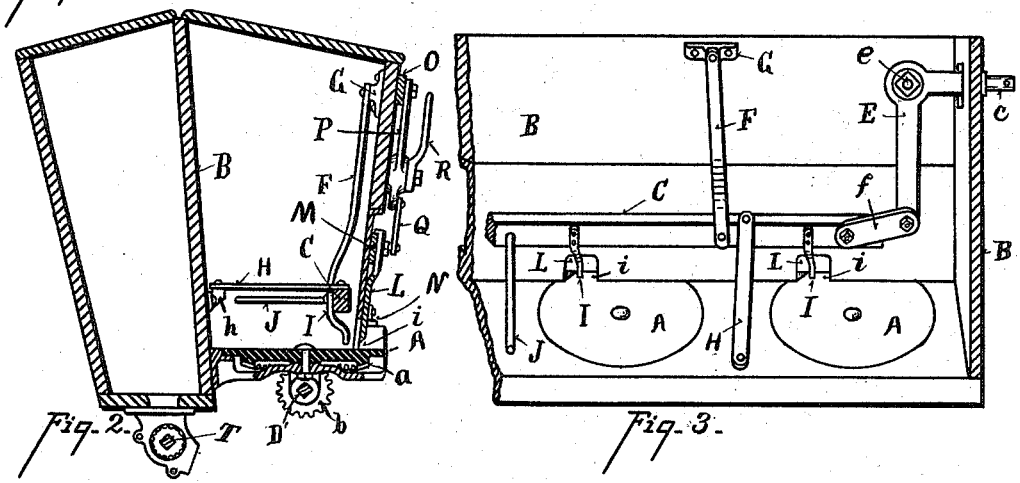
Figure 4:
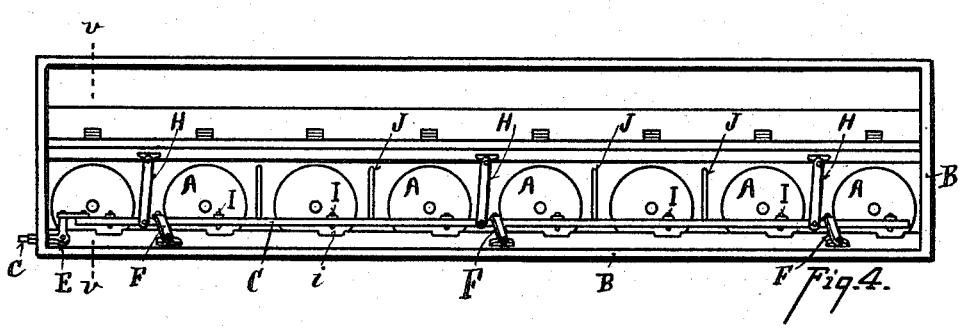
Figure 5:
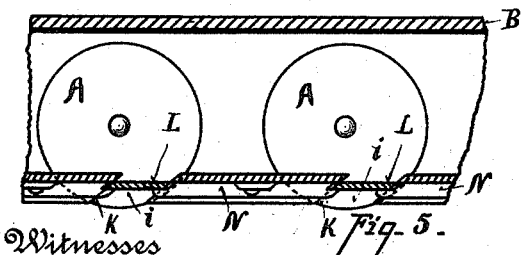

Figure 1 is a rear elevation. Fig. 2 is a cross-section on line $x\,x$, Fig. 1. Fig. 3 is a sectional view of the inside of the hopper, showing the agitator. Fig. 4 is a top plan view of the hopper and distributer with the lid of the hopper removed. Fig. 5 is a horizontal section through the hopper and gates.

Great difficulty has been hitherto experienced in the use of fertilizer-distributers. It is necessary to prevent the fertilizing material from bridging or clogging. Hence agitators are employed; but the least agitation that will attain the result is desirable, because the movement of the agitators renders much of the fertilizing material pasty and sticky, which destroys the object of even distribution. I have found the following method of constructing agitators to be very efficient and comparatively free from the difficulties hitherto encountered.

A represents horizontally-moving disks seated in the bottom of the hopper and rotated by suitable gears $a\,b$ in the usual manner.

B represents the body of the hopper.

C represents a reciprocating bar which is driven by means of the crank-wheel D on the shaft D′, extending horizontally under the hopper. T represents the seed-shaft. Both of the shafts are driven in the usual manner from the wheel of the machine.

$d$ represents a pitman, one end of which is journaled on the crank-pin of wheel D and the other end on the wrist $c$ of the bell-crank lever E, which is journaled upon the stud-shaft $e$ on the inside of the hopper, as shown in Fig. 3.

$f$ represents a link hinged to the bell-crank lever E and to the bar C, so that said bar is constantly reciprocated in unison with the rotation of the disks A. In order that said bar may move freely in the material and to prevent it from binding, it is suspended vertically by a series of vertical links F, pivoted thereto and to the rear side of the hopper. These links are projected by their pivotal attachment G forward and away from contact with the rear side of the hopper. In order to prevent this bar from being pressed backward and to maintain it in position against the weight of the fertilizer, I also provide a series of horizontal links H, which are pivoted to the bar C and to the studs $h$ on the front side of the hopper, as shown in Fig. 2. Thus the bar is securely suspended vertically and horizontally. Said bar is provided with a series of fingers I, working in front of the orifice $i$, pierced through the rear of the hopper.

J represents a series of horizontal fingers secured to said bar C vertically above the disks, but between the disk-lines, as shown in Fig. 4. As these fingers reciprocate with said bar C, they prevent the material from bridging over the disks, and this is very important. The disks travel outside of the hopper, as shown in Fig. 2, and the scrapers K cause the discharge of the material carried through the orifices $i$. The amount of fertilizing material discharged is regulated by a series of vertically-adjustable gates L, which are secured to a bar M, as shown in Figs. 1 and 2. Said gates are gained to move between guides formed by the horizontal flanges N. The bar M is raised and lowered by means of the horizontal bar O, which is suspended by means of bell-crank levers P, one being attached to each end and one to the center, as shown in Fig. 1. Q represents links which are hinged to said bell-crank levers and to bar M.

R represents an arm connected to the central bell-crank lever P, which, being moved, reciprocates bar O and moves bar M vertically, and with it the series of gates attached thereto. Said arm R may be provided with devices for securing it in any desired adjustment. By placing this gate-adjusting mechanism on the outside of the hopper and having the gates likewise on the outside of the hopper several advantages are obtained. When placed on the inside of the hopper, the joints rust from contact with the fertilizing material and stick, not being in constant motion. Again, it is desirable to make the adjustment very close, and it is desired to have a uniform and positive movement of all the gates, so that the delivery is positively regulated by a uniform size of opening. The above-described devices are more durable and efficient than the means hitherto employed for this purpose and give better results.

Having described my invention, I claim—

1. In a fertilizing-hopper, an agitator-bar C suspended upon vertical and horizontal links, and reciprocated by lever mechanism connecting the same with a power-driven shaft, substantially as specified.

2. In a fertilizing-hopper, an agitator-bar C suspended within the hopper by means of vertical and horizontal links, and provided with vertical and horizontal agitating-fingers, in combination with lever mechanism connecting the said bar with a power-driven shaft, whereby the agitating-bar is simultaneously operated in unison with the distributing-disks, substantially as specified.

3. In a fertilizer-distributer, the combination with a hopper having one or more openings in the side wall thereof near the bottom, of a plurality of horizontally-arranged rotating disks located within the hopper and each having a portion thereof protruding through the side wall of the hopper below the said openings, a series of vertically-adjustable gates located on the outside of said hopper and arranged to move over the openings therein to and from the protruding portions of the disks, a vertically-moving horizontal bar to which each of said gates is connected, a laterally-moving bar arranged above and parallel with the said vertically-moving bar, bell-crank levers pivoted to the hopper and having a connection at their opposite ends with both of the aforesaid bars, and means for shifting the laterally-moving bar to adjust the position of the gates, substantially as described.

4. In a fertilizer-distributer, the combination with a hopper having a series of openings in the side wall thereof, of a plurality of vertically-adjustable gates located on the outside of the hopper and arranged to move over said openings, a vertically-moving horizontal bar to which each gate is connected, a laterally-moving bar located above and parallel with the vertically-moving bar, bell-crank levers pivoted to the hopper and having a connection at their opposite ends with both of the aforesaid bars, and means for shifting the laterally-moving bar to adjust the position of the gates, substantially as described.

5. In a fertilizer-distributer, the combination with a hopper having a series of openings in the side wall thereof, of an agitator-bar suspended within the hopper and provided with vertically and horizontally disposed fingers, said vertical fingers being arranged to move over the mouth of the said openings, and the horizontal fingers arranged to reciprocate in a horizontal plane over the bottom of the hopper, and mechanism for reciprocating the agitator-bar, substantially as described.

In testimony whereof I have hereunto set my hand.

SYLVESTER H. JONES.

Witnesses:
FRED J. CARR,
LIDA SNODGRASS.